Figure 1:
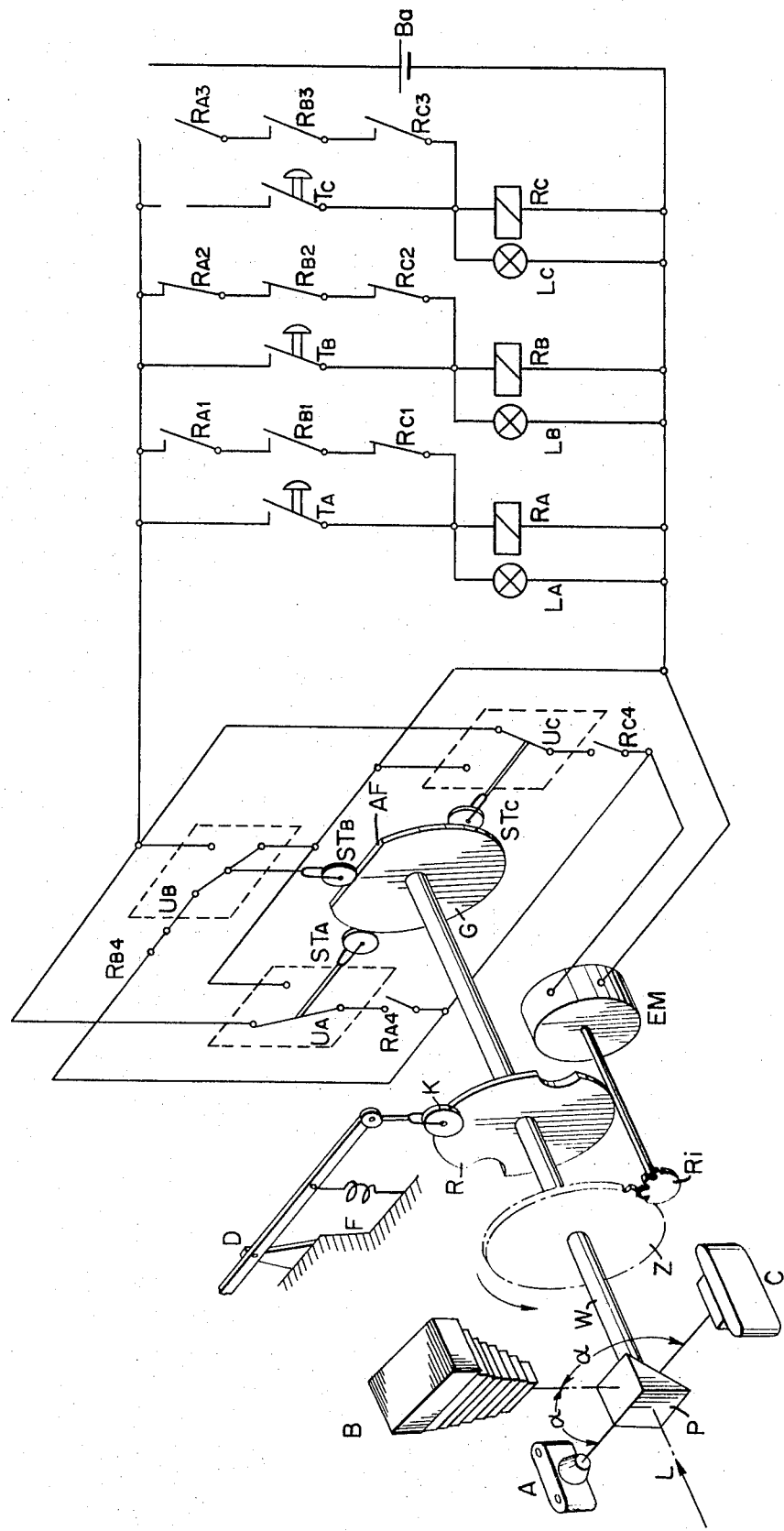

United States Patent [19]
Steinbatz et al.

[11] 3,871,009
[45] Mar. 11, 1975

[54] PHOTOMICROGRAPHIC APPARATUS

[75] Inventors: Alfred Steinbatz; Gerhard Kappl, both of Vienna, Austria

[73] Assignee: C. Reichert Optische Werke AG, Vienna, Austria

[22] Filed: Mar. 18, 1974

[21] Appl. No.: 452,178

[30] Foreign Application Priority Data
Mar. 30, 1973 Austria .............................. 2803/73

[52] U.S. Cl. .................................... 354/79, 355/46
[51] Int. Cl. ........................................... G03b 27/44
[58] Field of Search ................... 355/46; 354/75, 79

[56] References Cited
UNITED STATES PATENTS
2,651,969  9/1953  Thor ..................................... 354/79

*Primary Examiner*—John M. Horan
*Attorney, Agent, or Firm*—Alan H. Spencer; W. C. Nealon; H. R. Berkenstock, Jr.

[57] ABSTRACT

Selective use of one of a plurality of cameras attached to a microscope is achieved by accurately diverting the light into the optical system of the chosen camera. A light diverter is mounted on a rotatable shaft also carrying an indexing means and a cam for operating a plurality of switches. The shaft is driven by an electric motor connected to an operating voltage through one of a plurality of mutually exclusive latching circuits, each corresponding to a particular camera. When the shaft is rotating a motor shorting circuit is completed as the diverter approaches the selected camera to rapidly stop rotation of the shaft and motor to permit the indexing means to accurately position the diverter.

7 Claims, 2 Drawing Figures

PHOTOMICROGRAPHIC APPARATUS

BACKGROUND OF THE INVENTION

The multiplicity of tasks in photography, especially in photomicrography, involves the fact that for optimal work different type cameras are required. Thus, for instance, the Polaroid camera becomes advantageous when a visible result is to be rapidly achieved, the miniature camera is appropriate for routine jobs in which there are no extreme requirements of image quality. The plate or folding camera of larger format is utilized for tasks which exact the highest requirements for the photographic image as, for instance, for the making of reproductions. It is now already known how to so join together several cameras in a photographic device, that a rapid change of the cameras is possible without an actual exchange of cameras. Especially, such a device in the application of photomicrography is advantageous.

In the device mentioned, the cameras are stationary and the desired camera is made to be ready for use by a moveable ray-deflecting element, which is selectively positionable for directing light to one of the three cameras. Besides the positioning of the ray-deflecting element toward the camera desired, the selected position is also displayed. This is provided by a reflecting element rotatable by means of a drive means such as an electric motor to direct the ray path into one of the cameras and a selector switch means including a cam coupled with the drive means to regulate action until the selected position is reached and an indicator means to the position of the reflecting element and/or the camera coordinated to this position.

The present invention pertains to an improved device which serves the same purpose. Specifically, it has been shown that stopping the driving motor for the precise positioning of the reflecting element is very difficult because of inertia of the moving parts. Consequently, the cam included in the selector switch means requires deep and close-fitting indentations serving as position controls and the indentations, make necessary a substantial increase of the drive torque and likewise of motor size. Also, in the device mentioned, the adjustment of the desired camera cannot take place in one motion, but rather, rotation of the reflecting element is a step operation acting to rotate the reflecting element only to the next position, whereupon a command for additional motion is required.

DESCRIPTION OF THE INVENTION

These disadvantages are overcome by the present invention, which relates to improved apparatus for the producing of photographs with any one of a number of cameras. Briefly, the apparatus includes a moveable reflecting element driven by an electric motor to direct the light path to a selected camera and a selector switch coupled with electrical control circuits to control the operation of the driving means and provide indication of the selected position of the reflecting element and/or of the camera associated with this position.

In the apparatus of the present invention only a single control switch is required in comparison to the two heretofore considered necessary. For controlling the position of the reflector, an indexing means of the known type can be used and which is coupled to the electric motor. An indexing wheel included in the indexing means is preferably located on the same shaft as the reflecting element with a cam.

The cam can be a disk with only one depression which mechanically operates positioning switches through followers or the like. The number of these positioning switches corresponds to the number of position possibilities and/or cameras and each switch is of the single pole double throw type. For each position and/or camera, a display lamp and a relay is used. One pair of contacts of each relay is connected in series with a positioning switch and a pair of contacts of each of the other relays for each position and/or camera. Therefore, the total number of pairs of contacts required on each relay R will be equal to the number of relays plus 1.

The positioning switch is operated by the follower to short circuit the electric motor at the proper time to accurately position the reflector by the indexing means. The short circuiting effects an accurate and rapid stopping of the motor at the moment of the contacts of the selector switch are broken which reduces the engine torque required to overcome the detent of the indexing means. Therefore, a relatively small motor with low mement of inertia can be used and which can be stopped relatively easily.

For a better understanding of the invention, reference being made to drawings demonstrating an exemplification in a schematic and simplified manner.

FIG. 1 shows the overall arrangement with electrical circuitry, and

Figure 2:
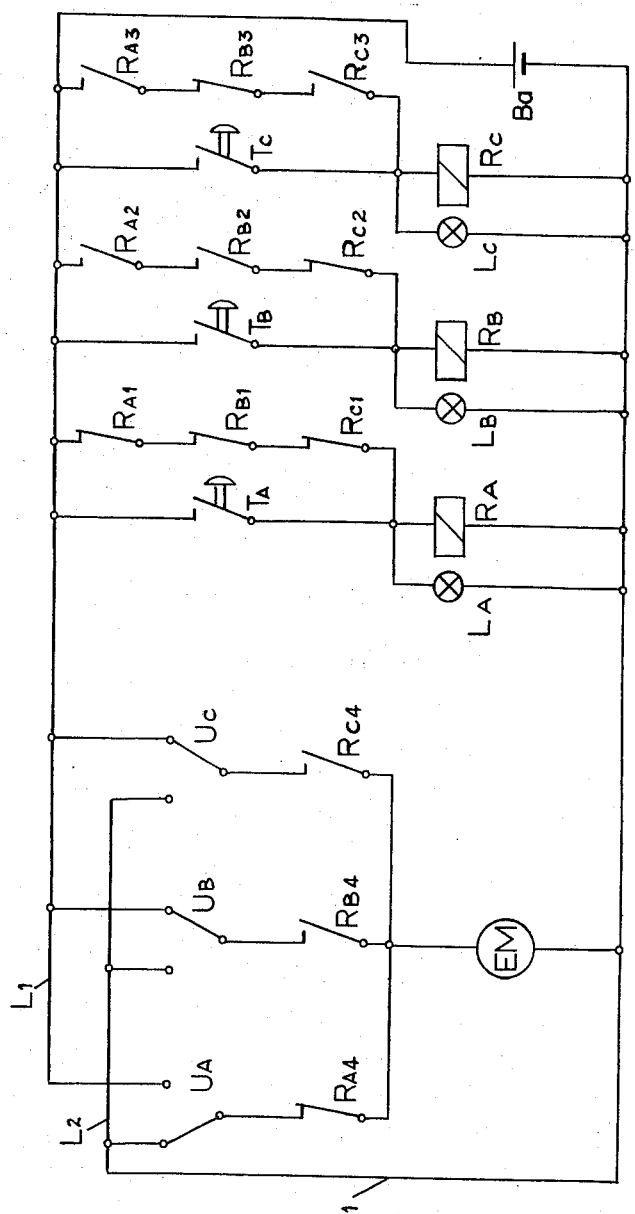

FIG. 2, a diagramatic electrical wiring plan of the circuit of one embodiment.

In FIG. 1, three cameras, designated by A, B, C, are arranged with their optical axes about a shaft W with the same angles $\alpha$ so that the optical axes intersect in the center line (axis) of the shaft at the same point. A reflecting element P, preferably a prism, is mounted on the shaft and rotates therewith to deflect the light rays into the selected camera. An electric motor EM drives shaft W by gears $Ri$ and Z. On the shaft W, cam G is mounted. Cam G has only a single notch or flat, AF. Each camera, or as the case may be, each possible position of the reflecting element, corresponds to one of followers $ST_A$, $ST_B$ or $ST_C$ respectively, which act in each case with one of the positioning switches $U_A$, $U_B$, $U_C$. These positioning switches are single pole double throw type. A voltage source Ba, indicated here as a battery, delivers the required voltage for the relays and motor EM. Three relays $R_A$, $R_B$, $R_C$ are each in series with a respective manual selector switch $T_A$, $T_B$ or $T_C$. A control lamp $L_A$, $L_B$, $L_C$ is connected in parallel with each of the respective relays and in parallel with each of the manual selector switches. A series circuit is in series with each respective relay of a pair of contacts from each respective relay.

In the circuit demonstrated in FIG. 1, all contacts are illustrated to be opened or closed to correspond to the position for camera B. The positioning switches $U_A$, $U_B$, $U_C$ are series with the electric motor EM and in one position connect the motor to the battery and in the other position cause a short circuiting of the motor. Relay contact pairs $R_{A4}$, $R_{B4}$ and $R_{C4}$ are opened and closed by the respective relays $R_A$, $R_B$ and $R_C$. When $R_A$ is in the normal or deenergized position, contact pairs $R_{A1}$ and $R_{A4}$ are open while $R_{A2}$ and $R_{A3}$ are closed; upon energization, the pairs of contacts reverse their respective positions, i.e., $R_{A2}$ and $R_{A4}$ are closed, while $R_{A2}$ and $R_{A3}$ are open. When $R_B$ is in the normal or deenergized position, contact pairs $R_{B2}$ and $R_{B4}$ are open and $R_{B1}$ and $R_{B3}$ are closed. When $R_C$ is in the normal or deenergized position, contact pairs $R_{C3}$ and $R_{C4}$ are opened and $R_{C1}$ and $R_{C2}$ are closed. Contact pairs for relays $R_B$ and $R_C$ reverse their position when the respective relays are energized.

For accurate position setting an indexing wheel R with a detent K which is biased by a spring toward shaft W and pivots on support F at point D. Naturally, any other indexing device which is known and appropriate could be utilized.

Below, FIG. 2 is next clarified in the same circuit arrangement as is demonstrated in FIG. 1, but in a more diagramitic form however, and showing respective switch positions after selection for camera A.

The position switches $U_A$, $U_B$, $U_C$ possess, in each case, two stationary contacts and a moveable contact which alternatively contacts one of the stationary contacts. One of the stationary contacts of each relay is attached to lead L1 and the other to L2. Only that positioning switch which is activated by the cam G is connected through its contacts to L2 shorting motor EM. When the positioning switch is in the L1 position, power to operate motor EM is controlled by one pair of contacts on the corresponding $R_A$, $R_B$ or $R_C$ relay. Inasmuch as the position of the reflector P is selected through manual operation of selector switch coordinated to this position, the relay $R_A$ connected in series with the selector switch $T_A$, for instance, is closed and closes one pair of contacts $R_{A1}$. The latter are in series with two other pairs of contacts $R_{B1}$, $R_{C1}$ of relays $R_B$ and $R_C$ respectively, which are normally closed and hence produce a current path for the continued operation of the relay $R_A$ after release of the selector switch $T_A$. The relay contacts $R_{A1}$, $R_{B2}$, $R_{C3}$ and $R_{A4}$, $R_{B4}$ and $R_{C4}$ are operating contacts; all other relay contacts are control contacts. In the energized state of relay $R_A$, contact $R_{A4}$ is closed so that action of the cam G through follower $ST_A$ will shift the switch $U_A$ from operating lead L1 to short circuiting lead L2. The camera A is therefore connected to the optical path and the lamp $L_A$ is lit.

Assuming that it is desired to set the reflector for operation of camera B, than switch $T_B$ is momentarily closed manually until relay $R_B$ closes operating contacts $R_{B2}$ and $R_{B4}$ and opens control contacts $R_{B1}$ and $R_{B3}$. Simultaneously, the small lamp $L_B$ lights up. Opening of relay contacts $R_{B1}$ deenergizes relay $R_A$ (see FIG. 1) which opens short circuit contacts $R_{A4}$. Inasmuch as the relay $R_A$ has deenergized and the relay $R_B$ remains until the activation of selector switch $T_A$ or $T_C$.

In FIG. 1, this new position B is recognizable from the location of the switching elements.

What is claimed is:

1. Apparatus for selectively diverting an optical path in a microscope attachment to one of a plurality of cameras radially positioned around said path, said apparatus comprising a rotatable light reflector having said plurality of cameras radially positioned therearound, motor means for rotating said reflector, indexing means for accurately positioning said reflector with respect to each of said cameras, each of said cameras having a motor control circuit to rotate said reflector and divert light to a selected one of said cameras, each said motor control circuit including a relay to connect motor operating voltage to said motor means, a manual switch to connect said relay solenoid to relay operating voltage and for concurrently preventing connection of other motor control circuits to said motor operating voltage, and means to short circuit said motor means to rapidly stop rotation of the reflector permitting accurate positioning of the reflector by said indexing means.

2. Apparatus according to claim 1 wherein said rotatable light reflector is mounted on a rotatable shaft having an axis of rotation parallel to said path.

3. Apparatus according to claim 2 wherein said indexing means includes a notched wheel mounted on said shaft and a detent biased toward said shaft.

4. Apparatus according to claim 2 wherein said shaft carries a cam and each said motor control circuit includes a relay for controlling a plurality of pairs of contacts and a two position switch operated by said cam.

5. Apparatus according to claim 4 wherein one position of said two position switch connects a shorting circuit to said motor means and the other position connects said motor operating voltage to said motor means.

6. The apparatus of claim 5 wherein some of said pairs of contacts are connected to provide a mutually exclusive latching circuit for said relay.

7. Apparatus for selectively diverting the optical path in a microscope attachment to a chosen camera which comprises a rotatable shaft, said shaft having an axis of rotation parallel to the optical path of light received from said microscope, a reflector mounted on said shaft, a plurality of cameras radially positioned around said reflector and being adapted to receive light deflected by the reflector, indexing means connected to said shaft to accurately position the shaft and said reflector to superimpose the optical axis of reflected light on the optical axis of the chosen camera, an electric motor adapted to rotate said shaft, a cam mounted on said shaft and adapted to rotate therewith, a plurality of switches radially spaced about said cam in respective positions corresponding to the radial location of each of said pluralities of cameras, each of said plurality of switches being adapted to be operated by said cam and having first and second switch positions, a plurality of relays where each of said plurality of relays is operatively associated with one of said plurality of cameras, each said relay controlling the state of a plurality of pairs of electrical contacts, a normally open first pair of contacts on each of said plurality of relays, said first pair of contacts for each relay representing one of said plurality of cameras and being connected in series with said motor and the switch portion of one of said plurality of switches correspondingly located to the same one of said plurality of cameras, said first switch position connecting a shorting circuit to said motor and said second switch position connecting an operating voltage to said motor, a set of pairs of contacts in series with each solenoid of said relays across an operating voltage, said set having one pair of contacts belonging to each of said plurality of relays, a manually operable switch in parallel with said set and in series with each of said relays of said plurality of relays, the contact pairs of said set for each relay having a normal position chosen to mutually exclude simultaneous operation of any other relay, whereby momentary operation of the manually operable switch simultaneously energizes the corresponding relay, deenergizes the remaining relays to complete the circuit through the corresponding relay across the operating voltage and closes the corresponding first pair of contacts to provide operating voltage to said motor which rotates the shaft, reflector and cam until the cam moves the corresponding switch to the first position to abruptly stop the motor by shorting whereupon the indexing means finally positions the reflector to accurately direct light at the chosen camera.

* * * * *